US012729782B2

(12) United States Patent
Butterworth

(10) Patent No.: US 12,729,782 B2
(45) Date of Patent: Sep. 8, 2026

(54) FLOATING UNDERWATER PIPELINES

(71) Applicant: Colin Butterworth, Launceston (GB)

(72) Inventor: Colin Butterworth, Launceston (GB)

( * ) Notice: Subject to any disclaimer, the term of this patent is extended or adjusted under 35 U.S.C. 154(b) by 0 days.

(21) Appl. No.: 18/703,548

(22) PCT Filed: Oct. 19, 2022

(86) PCT No.: PCT/GB2022/052661
§ 371 (c)(1),
(2) Date: Apr. 22, 2024

(87) PCT Pub. No.: WO2023/067333
PCT Pub. Date: Apr. 27, 2023

(65) Prior Publication Data

US 2025/0237325 A1 Jul. 24, 2025

(30) Foreign Application Priority Data

Oct. 21, 2021 (GB) ...................................... 2115095

(51) Int. Cl.
*E02D 29/00* (2006.01)
*E02D 29/067* (2006.01)
*F16L 1/14* (2006.01)
*F16L 1/235* (2006.01)
*H02G 9/00* (2006.01)

(52) U.S. Cl.
CPC .............. *F16L 1/14* (2013.01); *E02D 29/067* (2013.01); *E02D 29/10* (2013.01); *F16L 1/235* (2013.01); *H02G 9/00* (2013.01)

(58) Field of Classification Search
CPC ........... F16L 1/14; E02D 29/067; E02D 29/10
See application file for complete search history.

(56) References Cited

U.S. PATENT DOCUMENTS 3,478,521 A 11/1969 Petrik
3,901,038 A * 8/1975 Olsen .................... E02D 29/073 405/136
4,138,853 A * 2/1979 Lamy ........................ F16L 1/14 405/172
4,310,264 A * 1/1982 Brownlee ................. F16L 1/14 405/172
5,899,635 A * 5/1999 Kuja ..................... E02D 29/067 405/134
10,563,372 B1 * 2/2020 Huang .................... E02D 29/06
(Continued)

FOREIGN PATENT DOCUMENTS

EP 3865627 A1 8/2021
GB 2016065 A 9/1979
(Continued)

*Primary Examiner* — Benjamin F Fiorello
(74) *Attorney, Agent, or Firm* — Christopher A. Proskey; BrownWinick Law Firm

(57) ABSTRACT

An underwater floating pipeline with the ability to self-maintain desired depth beneath the water giving the ability to connect distant locations. The sections maintain and alter buoyancy for repair and maintenance. Multi chambered pipes allow different rates of flow. Automatic snap-shut doors protect against leaks and loss of pressure. Warning systems alert those in proximity to the pipeline. Freight may use the tunnels to avoid adverse surface weather and high shipping cost and fuel and labour savings.

14 Claims, 6 Drawing Sheets

(56) References Cited

U.S. PATENT DOCUMENTS

| | | | | |
|---|---|---|---|---|
| 2009/0126798 | A1* | 5/2009 | Mather | E21B 43/00 137/489.5 |
| 2010/0092243 | A1* | 4/2010 | Bauder | E02D 29/067 405/136 |
| 2017/0074424 | A1* | 3/2017 | Tinoco | F16L 1/235 |

FOREIGN PATENT DOCUMENTS

| | | | |
|---|---|---|---|
| GB | 2180578 | A | 4/1987 |
| GB | 2187207 | A | 9/1987 |
| GB | 2575850 | A | 1/2020 |
| RU | 002752839 | C1 | 8/2021 |
| WO | 1989009870 | A1 | 10/1989 |
| WO | 2018153670 | A1 | 8/2018 |

* cited by examiner 6
7

8

17

18

19

Figure 13
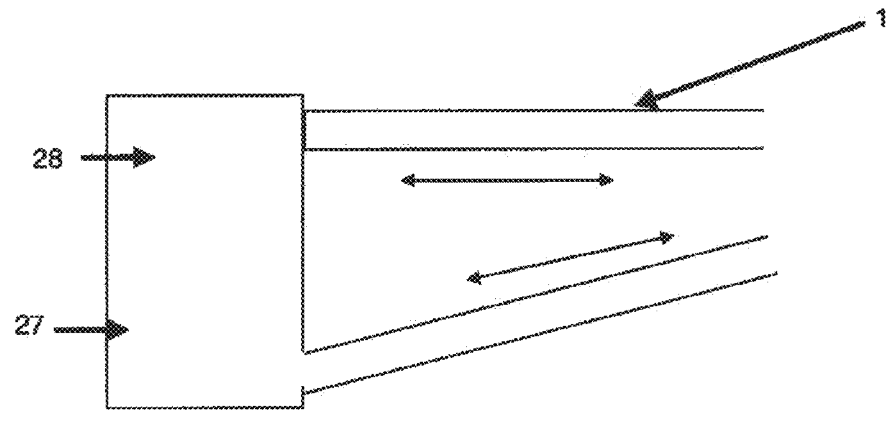
Figure 14
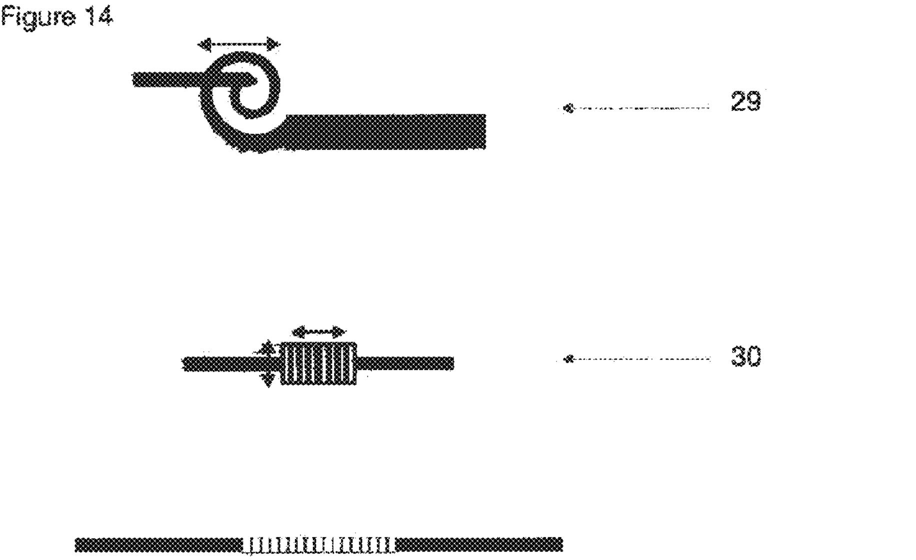

FLOATING UNDERWATER PIPELINES

BACKGROUND

The UK is experiencing a fuel crisis, its reasons are many fold but has highlighted an exciting possibility. Energy pipelines built from North and South America and Africa to Europe—ones that don't need to fully go all the way to the ocean floor. As that becomes possible the idea could be built elsewhere potentially joining all the continents and used to transport many and varied goods both liquid and other. A design to be self supporting and movable and used to span (great) distances underwater that conventional pipelines cannot easily with, in some instances, multi-chambered pipes for maximum versatility, speed of use and safety it could convey fuels (future, modern and conventional) and water or any number of piped goods, and due to design, possibly several at once. With this framework goods delivery could be applied to land based goods transit easing the workload to the road/rail systems. Less reliance on human intensive transit of goods via this floating pipelines system, often with multi-chambered pipes or groups of pipes, would allow for transport 24/7, from small quantities from business and individuals up to large company or country needs. It would allow not only the solving of the current "energy crunch" but have the ability to provide long term solutions and economic and environmentally conscious transport. Heating, waste and storage systems developed from initial concept.

SUMMARY

A underwater self buoyant floating pipeline with the ability to alter height, depth and angle. The function of pipelines being made more responsive by the introduction of a multi chambered aspect. Many chambers housed within one pipe to allow separate flow rates, direction of flow, increased speed of operation, products and even different product types simultaneously. Also pipe safety systems for the containment of spills from water based or land based pipelines. Framework attached to said "FUP" system and methods of maintenance and use. Home heating oxyfuel system and related pipework. A pipework system for the use with eco energy projects to maximize energy conservation. Waste management and conversion system and associated pipework. Water capture and delivery system to combat agricultural and environmental water needs at a distance. Container delivery and storage. A reduction in man hours and energy use, and emissions associated with transport, by providing a stable and highly efficient system for transport both above and below the water.

Floating Underwater Pipelines

The system would rely on the well proven technology of oil and gas (further called NatGas) transportation via pipeline. Used often for the lower cost per unit for movement, combined with the steady and even flows and reduced labour requirements as compared to road, rail and shipping transport. There are also vast amounts of emissions created from the use of ships for bulk transport as many are of them are of an older design and as a result heavy polluting. Put simply it is much cheaper and effective to transport large quantities of materials via pipeline, there are however areas where this is unfeasible. This system seeks to bridge that gap by allowing large distances across oceans, seas, lakes and the like via a system that rather than trying to lay pipe along the uneven and often extremely deep and markedly pressurized and dangerous working depths takes a more direct route by suspending the pipe someway below the water surface but also some way up from the bottom. FIG. 1 shows the floating pipe with several systems that are envisioned to function with or like the FUP itself. The pipe is envisioned to be made of a strong rigid plastic, of it is hoped a recycled nature, although there are situations where other materials would be preferable such as metals or of composite(s). The pipes would also have the function of separate "multi chambers" being built in it so that pipes could be brought into use relatively quickly as sections could be filled rather than having to fill the whole pipe before operation. That would also have the added benefit of being able to transit more than one substance at once and also be able to swap out substances at short notice so that if there were a great need transported goods could be adjusted for the filling of that need. The initial envisioned embodiment is the transport of North American LPG or LNG-NatGas- and or other natural gas products from that continent to the European one. Certainly the coasts of South America and Africa could be applicable early locations to use this system also as NatGas/oil products are already exported in great quantities from there. The desired route would transit from either the North Eastern United States or Eastern Canada across the Atlantic Ocean and hooking directly up into the already existing LNG terminus on the Bristol Channel in Avonmouth Bristol—processing past the historic Tin (Tyn) rich Cornish coast, the inspiration for the Process' name, a place to which people traveled great distances across seas to obtain a product, tin (tyn), as it was of such huge importance to their lives and the advancement of their society—as energy is today. This is the desired initial location on the European side as there is already a massive infrastructure in place there capable of massive inflows of NatGas. These facilities are tied directly into the national grid of gas pipelines and capable taking an upgraded and constant flow from from such a massive project. The UK is the desired location for the initial hook up location as the existing connection to Europe through the pipeline to Belgium is capable of gas flowing either way. So once the NatGas is landed in the UK it can be quickly delivered onto the rest of Europe by this and other pipelines if need be. NatGas is a very clean burning fuel and allows for much more harmful sources of fuel to be avoided in use for the generation of power and heating. If the UK and other European nations at the same time were to develop and restore old oil and gas wells caverns as storage systems this could lead to an evening out of the fuel supply system and avoid spikes in price and squeezes placed on supply. At the very same time if a system of carbon capture were enforced and adhered to then the emissions from the burning of the fuel could be contained in similar cavern systems as the gas storage or indeed pumped into still running oil/gas fields in Europe to allow more complete and economic extraction as is already done there and elsewhere.

The safety of the pipe system is of great importance to the overall trust in the system. There are several benefits to this style of system. Firstly is the accessibility of the pipe should damage occur. Then there is the modular nature of it and the same repeated nature that allows easy and sure use as all, or most, of the parts would be exactly the same. If damage occurred it would be a matter of knowing the amount of damage and a simple change out of that section could be easily effected. This repair/inspection/refit could be preformed via submarine, ROV, AROV or indeed being brought up to the surface (FIG. 8). The system is envisioned to have a number of monitoring and safety systems working separately and in unison so that the pipe and its contents and pressure are always being monitored for accuracy and for safety.

If there is a need the pipe and its contents would also have the ability to be lowered or raised out of harms way, via buoyancy and also by mechanical means (FIG. 1). There would be a series of "auto cutoff" or "snap shut" gates (FIG. 8) built into the length of the pipe and these would have the ability to literally snap shut shut door(s) and cause all flows down the pipe to cease and not loose pressure or product into the surrounding environs. The terms "snap shut door" and "snap shut gates" are used interchangeably in this disclosure. This would have both direct and shore based capabilities for operation linked directly into a dedicated and secure system. This would also make redundant the need to "suction" the pipeline to remove its contents thereby allowing a safer faster restart of operations. The transit of gas based product and specifically NatGas is desired in its initial deployment, as if a rupture should occur the safety systems would trigger and would only allow small amount of gas to be lost that would quickly dissipate into the atmosphere. Oil and other such products could be transited, and are envisioned to be, but more stringent safety measures would be needed to ensure minimal oil or other product loss, see spill bandage later (FIG. 9). Water would be another product that would suit this mode of transit due to its weight and how there are often great distances between need and location (FIG. 6). Shipping of it expensive, while road and rail are impractical whereas a pipe direct from source routed underwater to the site of use would be both economic, desirable and worthwhile.

Functioning of FUP and Conventional Pipe Interface

There may be instances, and it is envisioned that it will happen, that this style of floating sub-water pipeline will in certain circumstances need to connect into a standard style of sub-water pipeline (examples of it in FIGS. 6 and 7 but applies to FIG. 1 also). The connection between these two styles of pipeline would need specific and careful design. The nature of existing sub water pipelines is that they are laid at the bottom of the desired route and either covered or protected so as to minimize interaction and risk of damage. There are circumstances like crossing vast oceans where the depth, and in some cases extreme depths, and the complex nature of the base terrain would make such a project unfeasible. If however the semi floating pipeline design were used these complexities can be avoided and the distance bridged. There is however the areas nearer shore where a buried style of pipe would still be desired to avoid contact and damage, it is envisioned that a connection would be used to allow the two styles of pipe, fixed and floating, to be joined and work together (FIG. 9) examples of, but limited, to follow. A "Shell" style (so called because of it sideview [FIG. 9 image 29]) of pipe where a degree of movement is allowed via the pipe wound around a wheel so when more pipe is needed it "unrolls". Another version is a concatenated section (or sections over length [FIG. 9 image 31]) that are able to "flex" to accommodate movement. Also "Stacked interlocked pipes" where pipes are connected but have the ability to slide and therefore facilitate movement (looking like an organs pipes but with the pipes able to slide past one another [FIG. 9 image 30]). Or static post and glide system also where one or either side is permitted to raise or lower (FIG. 9 image 32).

The individual sections of the pipe would be linked to allow through flow but with the snap shut style of gates the sections would become able and act in isolation. Underwater pipelines are currently built and either sunk into place with water removed once in place or with "caps" over the ends that are removed once the pipeline is sealed or "built" on deck into shape and laid off the back of a boat—where this design differs is that on each section, or group of sections, the snap shut doors can be opened and closed at will and the sections can be disengaged even after the pipeline has been completed. This has advantages in that should inspection be needed, interaction required or if sections were damaged these can simply be shut off and removed from the overall pipe, with a rapid replacement of pipe sections to ensure smooth operation. The pipe sections themselves would have ballast tank and buoyancy control systems to allow the individual sections to have a role in depth maintenance (FIGS. 11 and 13). With these built into or between the skin(s) of the pipe sections each section would then have the function similar to a submersible or submarine, but with the ability to link up to form a functional pipeline. The pumps to remove water/gas from within the pipes would also function to drive pump jet style manoeuvring systems, screw propellors may be preferred in some situations for individual or group pipe movement. The pipe sections would be able to drop down into place and connect to the adjoining pipes to create a seal and then open the snap shut doors when ready to operate. The need for specialized underwater welding is eliminated and also the need to have the entire run of pipe above the water, a supply ship would simply need to arrive at the delivery location and allow the individual sections be lowered into the water and controlled into desired location for connection to pipeline. The system could still be laid out "in string" off the back off a cable laying style vessel if required, but the snap shut doors give versatility to the overall system and ability to use many types of vessel for creating pipelines. The design of the individual sections having their own ballasts and depth control (FIGS. 11 and 13) and also the motive power associated with jet pumps or screw propellors, and with ability to work together for best functionality, has a very important quality in that with these system answer another of the major issue associated with underwater pipelines is combated, that of "fixing location" (FIG. 1). Traditionally the they need either a buoy at the surface to hang from (with adverse surface issues) or be buoyant and fixed to the waters base (with cost/material constraints, especially for extreme depths) or hung between close enough land masses to support the system to keep in desired location (limiting location choices) whereas with this system the pipe itself becomes the "fixing" as it would be able to actively hold its position through its systems and be able to stay in the desired location and move should it need to. The exterior of the system could be sculpted for best hydrodynamic efficiency, much as the hydroplanes or diving planes on submarines give the ability to manoeuvre, the outer shape could be used to steer the pipe sections to desired place and assist in holding that position as required. This system combines the economical product moving capabilities of a pipeline with the reach of an underwater tunnel and the underwater safety and freedom of movement of a submarine.

Utility Box and Goods Transit

There would of course be a need to transport greater quantities of products along the same route. This system could be built with the express purpose of creating a stable initial infrastructure that further pipes, wires or lines could be attached to thereby keep costs and complexities to a minimum and allowing faster and easier connection. With this transport of product system, liquid or similar, there is the next envisioned element whereby the system would not only transport liquid product but also solid (FIG. 1). The pipeline system could be used to take goods, parcels, letters, boxes etc and thereby create an alternative transport route to air travel, with its speed, and ships, with their economy. The goods could be placed into special boxes for entry into the system and these boxes would then be moved through the pipeline via a number of possible methods like but not limited to, suction, magnetism, chain, pulley, rail, drone, own motivity or similar (FIGS. 1 and 2). Akin to the water based multi chamber pipelines a system called "Utility Boxes" would be of great use on land whereby a series of "boxes" are laid out in connected lines, or cast/made in situ, that allow either goods and parcels only to transit (FIGS. 4 and 5). Another variation that allows goods to travel but also has chambers within the whole for the placement of pipes, wires or cables hence "Utility Boxes". This element of the system allows the ability to not stop at the waters edge as it would be able to run goods right up onto land and create a grid system for goods delivery. The system could use the FUP or indeed conventional styles of underwater pipeline or combination thereof with connection between the two for travel to land then a new dedicated system for land transit (FIG. 3). This system would be capable of transporting vast quantities of goods and remove the pressure that is faced often to find qualified heavy goods vehicle drivers as the goods could be transported economically and efficiently to central drop off sites initially, then as the system develops direct to homes and buildings.

With a vast amount of the worlds goods transported with the use of container a system like this would be remiss to not address the transit of these. Containerized goods movement is at the heart of mass movement of goods so the FUP would specifically deal with their movement and storage. The ability for the containers to be fed into a pipe and be whisked along to the other side of vast oceans with low emissions in transit would make a huge difference to the overall energy requirements, costs and environmental pressures as compared to the issues surrounding the current shipping container methods. Certainly if the containerized shipping were to be done under reduced air or under vacuum the efficiency would another boost to give an even greater reduction in overall energy requirements for container transit. Several of the issues surrounding shipping are laid out below to show where FUP containerized shipping method combats waste damage etc for a better more environmental approach; bilge water and consequent non native species environmental damage; older service ships relying on outdated engines that are massive polluters; manpower and lost time as much of the time spent on these ships is "lost" as crews are needed for entire journeys but for much of time they are under utilized; Container losses off ships are a common occurrence and these lost containers risk leakage and becoming a danger shipping as many do not sink but often lurk below the water line able to sink ships if impact occurs; if container ships are damaged as there is the risk to the whole ship (as recently happened off the coast of Sri Lanka and the devastation that that caused) rather than being able to isolate the individual (s) "issue" and contain and deal with it accordingly with no spill or sunken ship/pollution.

Human/Animal/Plant/Other Functions and Access

Once safety has been proven and the system well established the pipelines could be developed to transport people. Perhaps even having clear pipelines so that the experience could be a desired one, like the famous transatlantic liners known for their luxury, comfort and speed (FIG. 1). The pipelines could also be used to create/access storage, wildlife and sea-farming opportunities, via the modular and reach aspects of the system (FIG. 1). A major hurdle for sea-farming is indeed access and with this system the link to shore is already built so these would be "bolted on" and run within the overall structure of the pipelines that need transport, maintenance and goods flow to have the system work. With tracks or transit rails laid to the top of the pipes (for goods transit and for the quick movement of pipe sections to area of need-during construction and later for section repair/replacement) and "pipe moon pools" into the pipes access would be available for goods both in and out along the pipe length. Sea-farms could be developed directly above or to the sides branching off but using these arterial routes for access and delivery.

The pipeline would be able in the short term to deliver much needed NatGas type products but could of course transit many other products. Hydrogen is of course very much talked about as the next big power product to replace fossil fuels and a system like this could well be used for it's transport. In the first element however these NatGas imports would be able to reduce the "stop gap" coal use that has sprung up due to fuel shortages and supply issues. Nuclear electric fuel is also being used but there are issues surrounding that as well and there are issues with efficiency when used for heating-so if it were able to transport NatGas it has a direct offsetting action for either "dirty" or "controversial" fuels.

Water Away, Through Effective Route "WA,TER"

And there is of course the ability to transport fresh water as well (FIG. 6). This could have a huge effect on the amount of "greening" of arid or dry lands for agriculture and conservation. There are vast areas of land that are too far from fresh water to be effectively used in crop production, but if these pipes were able to bridge these spaces and bring fresh water to where it could be used then marginal land could be effectively and in some cases quite economically brought in to use. The water could also be sent out to offshore located floating farms, the water other wise lost to the sea would be caught and transferred to sea based farms to alleviate the pressure of land based farming. Indeed the very flowing of rivers could be harnessed to power the movement of the water to its needed location. It would require the consent of the country in which the river flows and would provide a potential stream of income for what otherwise would only flow out into the sea. A prime example of its use would be the transport of water to drought hit Australia. The water could come from its near neighbours or further afield from places like India. There would even be a case for having water travel from outflowing rivers in the country to areas of need within the same country. Wildlife protections would be a consideration, but it would be able to provide vast amounts of freshwater without the need for energy intensive desalination. If EPICPIP were used along the pipe run then the costs to transport the water would be economic, and the environmental cost kept low also.

EPICPIP

This, and other sub water pipelines, could be powered by energy inputed along the route (FIG. 8). This would solve several issues in one. The pumping power to move from one side of the Atlantic for example would be huge, but if the pipelines had smaller pumps and movement generators laid out along the length of the pipe then the energy use would be "local" and losses in transmission would be minimal and if these pumps could use directly generated power from either offshore wind or similar "eco" energy systems then the transit could be very economic. Eco power (NatGas (with emissions retained), Hydrogen or the like) could also be delivered, even via the pipelines, and used where needed for best efficiency. These "Eco Pump or Inline Compressor Power Input Points" could also be applied to existing, and new, conventional sub water pipelines to reduce costs and to aid transit with a more environmental energy source(s). Having the EPICPIP be the in-line power source able to power the transit of both gases and liquids and solids, as well as having an additional function towards the buoyancy control elements of FUP where appropriate, and having the ability to work within the overall control of the system whilst keeping emissions and power consumption to a minimum makes it an attractive design. As the pumping/transit of product is key to the system so too is depth control and this dual aspect to these pumping units allows economy in construction and operation.

"Buoy Power"

Another form of eco power that could be used in conjunction with either the EPICPIP, the FUP or conventional pipelines is one of the very actions that this system is designed to avoid, that being the action of the waves. Buoys laid out on the waters surface in the proximity (near to begin with, increasing in range when possible) to the pipe system along its length could harness the up and down action of the waves to power the pumps, and thereby the pipeline transit of goods, by either generating electric, hydraulic energy or direct mechanical energy. As the energy is produced in close proximity to the use then the losses in transmission would be minimal and the transit through the piping would be achieved with great environmental benefits as there would be little or no emissions and as a consequence there could be a great reduction in cost to move goods. The buoys could be tethered to the bottom or indeed like the rest of the FUP have "self location fixing abilities" with a subsurface buoy or "submarine anchor buoy" or be directly attached and use a part of the FUP (acting as the subsurface "anchor buoy") to generate the "pull/push" that is needed to create pumping power. As the surface buoy travels up and down with the wave action a difference in movement is created if the subsurface buoy remains at an even depth, this motion can be harvested for power. The energy could be stored both with in the submarine buoy the surface buoy or indeed in supplementary tanks/vessels. If these buoys were deployed in "hefted herds (or hefting)" with a range of individual ("hefts") buoys, or within "fields" of connected buoys ("sheep") then these could cover areas large enough to generate enough power for pipe pumping needs and more. If stand alone hefted herds of buoys were activated then supply type vessels could travel to them individually and collect power generated and stored for transit. A sub water weighted buoy able to maintain a stable depth, much as the FUP pipelines themselves can, is then connected to a floating buoy that would ride atop the waves and allow that pull upwards to draw a piston, crank or the like and create motive power. The then downwards pressure created by the drawing down of the buoy by gravity and the waves movement would be able to force more power through the system by using that force to create a secondary force to harness, via a "stiffened arm" approach so rather than just allowing the buoy to drop the connection to the sub water buoy is taut or stiffened in nature forcing that "dropping power" to be used rather than ignored. The two, upwards movement and downwards, could be combined to run a power generation/storage system or could be treated separately to form different power generating schemes. With the sub water platform, whether hefting or field, should the need arise they would be able to sink below the waves using the same ballast and pump system as the FUP pipelines. The needs being passing vessels, storms, oversized waves etc. so a safety and monitoring systems set within and also some distance from the units would be preferred. The ability for the top buoy to "snap" away from the sub water system would be needed to preserve the overall system, the buoys themselves would be monitored and capable of sending out location so in the event of "snap and loss" the buoy could be found and retrieved. A colour change option (either flashing or bold solid) and warning systems to alert vessels in proximity/location or loss and the retrieval, so that vessels approaching are told of the buoys location, in a similar fashion to the pipelines, and then the buoys could also alter their appearance to give extra weight to their presence and also should the need arise to find even one lost buoy (sheep) those searching for them (shepards) would be able to detect and retrieve even that one lost "sheep from the field, or hefting" with relative ease. Buoys with the ability to change shape so in event of overpowering pull (freak wave etc) the gases within the buoy are drawn back into the submarine buoy to reduce resistance, simply reflated as needed. Having the buoys be able to treat the energy created in a number of ways or formats allows the best use of power. Where close enough to the EPICPIPs the power can be directly transferred/used but where there is a distance between then the power can be transmitted in the best format, examples of but not limited to: be that cracking water (purified or fresh water is best so that could be done on board the buoys or transferred to buoy directly [see E.I.D.E.R. later] or by delivery via supply vessel); or the pressurization of air so that can be conveyed and used where needed (a very attractive option as the technology to use pressurized air is well know and easy to apply to a wide range of tasks); mechanical is also a desirable function of storage that suits this system in that there is already movement occurring that can directly harnessed-so clockwork storage or spring loading. If electricity is made on these buoys the issues of loss in transmission are of acute concern as in the power generated is to small to transport long distances; and if you are relying on batteries it requires these, which are energy intensive to produce, and these will over time degrade-even the long life ones, resulting in the need to use more resources and more waste being generated (the "long life" batteries are often made of non reusable one use lithium batteries). The hefts or the fields could use the support or supply vessels for the transmission of the stored power, although the system works well with the FUP (and it is its preferred delivery method due to the cost saving as discussed above) it also has the ability to function independent of it, delivering direct to shore the harvested energy. In short this "Buoy Power" system has the potential to generate vast amounts energy by producing smaller amounts of energy over a large area, that can be then be accumulated, thence transmitted in the desired convenient energy format, along the FUP or conventional underwater pipeline if required or other vessel if preferred, for best use of this truly green energy.

Spill Bandage and Pipe Bundage

There has always been a risk of and consequent fear of pipeline rupture and damaging spill. This system creates a seamless defence towards that in that as there would be already rupture or leak detection and auto shut off systems another layer of defence could be added whereby an active spill "bandage" is deployed to the damaged zone. This could be a permanent fix or indeed just a temporary patch but it would allow not only the spill to be averted but also the pipeline to continue to function, even if it were perhaps at partial capacity. A high strength "bandage" could be housed in sections laid along the entire run of pipe and when needed these can be quickly deployed and wrapped over the damaged section then some means of holding that sleeve in place is enacted, be that mechanical, vacuum, hydraulic or chemical. These bandages could be placed along the pipe system when it is laid out (or retrofitted) and left in place so there is always a bandage with in range. This system could be of course of great use to conventional pipelines too, both underwater and overland with a special sub system also applicable for underground pipelines. The underground type would entail an outer "bunding" type pipe (FIG. 9) with the bandage enacted in the space between the pipeline and the bund. This would be no doubt more expensive to install than a standard underground pipeline, but it would allow it to be marketed as two or more layered pipeline and as safety and the environment are playing a bigger role it would be a helpful tool. With land based pipes a half round pipe could be deployed below to catch spills and direct them to a catchment area. If the pipes were also fitted with snap shut gates at intervals and the spill detection system associated with them the losses from pipelines would be greatly reduced in event of a spill, as well as the environmental consequences. These extra layers and safety systems would be crucial for the rapid elimination of hugely damaging and costly spills, both economic costs but also time and of course environmental clean-up costs.

Container Storage at Water "CSaw"

Much has come out of the supply and fuel "crunch", one of those things is that it has shown that there can be bottlenecks created around countries port systems. The use of the "CSaw" system would have the ability to be applied to answering that via the use of underwater tubes and dry storage (FIG. 13). Containers could be off loaded direct to shore or fed directly into these "holding tanks" or "SaW Tubes" to allow the country/port to deal with when ready to do so, thereby giving the ability to vastly increase the storage capacity of ports/countries. This would then allow the ports to carry on functioning and also allow the container ships to offload goods and carry on moving and delivering goods rather than being forced to "stack up" and act as an expensive and fuel hungry form of storage in front of already full ports. Much like the system of hospital ships being able to travel and deploy where needs are, these could be brought into aid where they are needed quickly and provide the service for as long as required, even permanently. With separate functions and depths able to be dealt with the makeup of the actual Saw Tubes would vary on specific location but the hoped initial materials for walls, roofing and flooring are made up of recycled plastic-either tubes, solid, box section or inflated, other materials would of course be useful and desirable is some instances. Creating essentially a large box or boxes at sea for the storage of boxes (containers, "sea cans" or the like) at sea, with control system thereof. There would need to be container movement within the system and cranes or similar in the SaW Tubes themselves and systems of conveying the containers in a similar fashion to the motive powers employed with in the FUP pipes/tubes. Autonomous or automatic container movement would be desired in order to maximize cost savings but human control, interaction and monitoring of the system would be inbuilt and crucial. The containers are either taken to the location of the CSaW and lowered down into a receiving chamber of the SaW Tubes, with the water kept to the outside, or travel along in an underwater tunnel(s) to be fed in and housed in similar stacking fashion.

Water Based Sewerage Plant ("Gas Bags"

These systems are also applicable to the treatment of waste (FIG. 7). As happens now, often pipes are laid out to sea and waste is simply allowed to float away. This is due to the cost of treatment and the often constrained space on land not to mention the issue of proximity-most people want to not live near sewerage plants. This issue is solved by using pipelines to take sewerage out to sea, but rather than just allowing the pipe to "drop" the waste at sea, or in the water, there would be treatment plants based in the water (sea, lake, ocean or the like) to deal with the waste and to create usable products from this waste. The constant supply of waste could be turned into a system that is designed for the express purpose of creating methane and fertilizer and protecting the seas from more damage. The space required to allow this function on land would be prohibitive whereas if the issue were taken "out to sea" the space is greater, due to the size of the waters surface area but also adding in the 3rd dimension of depth, and the other constraints are removed (smell, nimbyism etc.). It would also be able to release land that is currently being used for sewerage treatment for other uses housing farming etc and have a positive impact on the environment. Home based systems for methane generation are often cost prohibitive whereas this would give the scale and the constant supply needed for industrial production. Even in the event of a spill it would still be better than the current situation as it is actively being pumped to sea now or processed to some degree and then spread upon the land with potential run off related issues, whereas this system would actively act to preserve the waters. There could be large cells or "bags" built to hold and then to actively encourage the waste to degrade, in specific often oxygen reduced situations, to produce methane via bacterial action, or similar, to then pipe/bring back the products of that, being methane and sanitized fertilizer. Methane itself is a powerful green-house gas, but as the gas would be contained, piped and used within the overall system it would have the potential to replace other sources of fuel and would have a positive impact on waste and energy requirements. The NatGas methane could then of course be fed into the grid system via these pipelines or used directly.

Safety Maintenance Operation

The pipeline would need to be maintained and serviced and the use of a connected ROV system would be desired. This could also access the inner parts of the pipeline system via a "pipe moon pool" concept (FIG. 8) where there would be access to the underside of the pipes at certain locations for access. There could also be integrated pumps laid out at distances to ensure the pipe if damaged could quickly be brought back up to production, external pumps could still be used of course. The snap shut doors could be integrated into this system to allow speed use and repair as the whole system needn't be shut down (as separate parts to the pipe could be individually shut) and/or drained for repair (or relining operations as would be expected from the transport of hydrogen due to "embrittlement"). The pumps/EPICPIPs could also be integrated into the buoyancy and buoyancy bag system to hold certain quantities of gas or air to allow the pipeline buoyancy system to function by moving the gases back and to the pipeline, with the ability to draw air from above the water if needed (FIG. 1). The pipeline could also have a mechanical movement function whereby screw propeller or jet or similar are attached to the pipeline or its dependant parts to give the pipeline or its operator the ability alter it and its dependant parts position (FIG. 1). The pipeline system could also be raised all the way to the surface to access it for safety, repair etc. An umbilical type cable/pipe system to access the pipeline from the surface or sub surface or indeed sent up from the pipeline below to ensure safe operation and maintenance (FIG. 8).

Supply/Emission Pipelines—Oxyfuel and NOxyfuel Home Heating

Governments are committing ever more time and money to the greening of the environment and some are even trying to eliminate NatGas usage in this push. This invention seeks to address that by having the complimentary portion whereby the NatGas products are still burned either for heating or power generation but the emissions rather than being released direct to the atmosphere they are drawn into a system that accepts it and takes this for repurposing. The idea of carbon capture isn't new, the concept of an integrated two way oxidizer delivery and exhaust capture system add on to existing NatGas system in relation to home heating is (FIG. 10). The UK ran out of $CO_2$ during the last few weeks, $CO_2$ is a major part of the emissions from NatGas use and as such there is if a pure stream of $CO_2$. If it is economic to have the fuel piped to a building for use then it must also be affordable to have a pipe take the exhaust gas that is created back and used, it would certainly be in most cases cheaper and more environmentally sound than ripping out the entire existing NatGas infrastructure to replace with the less efficient electric alternative. NatGas could then still be used direct in homes to run either standard central heating or combined heat and power units (CHP) making even more efficient use of the natural resources. With the oxyfuel combustion style being the preferred, but not exclusive (NOx etc), method of burning. Here a stream of pure Oxygen is piped direct into the burning chamber and this allows an almost pure form of $CO_2$ to be emitted and with this system piped back for use/sequestration. This not only allows for a cleaner burn of the fuel, but also creates the desired exhaust outcome as it gives a nearly pure stream of it, thereby resulting in a marketable and useful product. While the pipes are being laid into receive the emissions another set, or indeed a multi-directional pipe that takes oxygen one way and the emissions the other, could also be laid in to take pure oxygen in for this proven "zero emission" system. The system could be used to transport NOx (or other oxidizer(s) if desired) to these burning devices, becoming known as "NOxyfuel", as it is also known to create a higher amount of energy output that using standard air. Another function within the system is the retention of heat from the exhaust stream (FIG. 10), as the exhaust would be contained rather than released into the atmosphere, whereas before it needed that heat in the exhaust to draw the exhaust away from the building and people, it now gives a chance to allow as much heat as possible to be retained by the heat generator/user. Making the use of NatGas even more clean burning and eco friendly. With the added function of being able to take in other forms of emission via multi chamber aspect, laying the groundwork for an integrated and green heating and green energy revolution.

Eco Instrument Delivery and Energy Recovery (E.I.D.E.R.)

Of also great interest right now is the wasted energy from wind turbines and solar panels and of course the energy going unused in the case of wave action, as the Buoy Power system seeks to address. These systems could with one pipe bring to the eco energy producing wind turbines/solar arrays/"Buoy Powers" water for cracking into hydrogen and oxygen, then draw away the products. With the need for water (fresh water is preferred in the process of water splitting as it is more efficient if fresh water is used rather than saltwater. The saltwater could be desalinated at any of the locations solar/wind/buoy and then either used within the system for water cracking for hydrogen/oxygen production or transited on for potable or fresh water supply) and then the need to deliver the products away and to the site of use this system provides a framework within which that process can function—with the simplicity of one pipe many products can transit. The oxygen could of course feed into the oxyfuel home heating system (FIG. 10), or any other oxygen need-medical, industrial etc, and the hydrogen delivered via pipe to the desired uses. The ability of transferring heat away from these eco systems also has a place within this system as heat is produced within these systems, but is not necessarily to the benefit of the workings of the system (solar panels work better when not warm and turbines in use can become very warm and need cooling). This system would allow for this excess heat to be collected and channelled for use, be that heating, hot water, desalination (thermal) or other. The conservation of energy could also be enacted within the system by directly pressurizing air at source of energy generation and allowing that to be fed back to site of need via pipe, FUP or other, or indeed having it transferred via support/supply vessel. This pressurized air method has some merits in that there is no risk of hydrogen embrittlement to equipment or pipes and the air itself in event of leak is only air, albeit under pressure.

DESCRIPTION OF THE DRAWINGS

FIG. 8) Shows functions surrounding FUP's operation. Vessel contact and interaction pipes/cables/wires—13. ROV and "pipe moon pool"—14. EPICPIP—15 and 16—and pumping stations and buoyancy control systems and ballast system and spill bandage—16. Snap shut gates —25.

Other exhausts could be attached and piped into same system. Exhaust with heat capture and exhaust trap—24.

Figure 1:
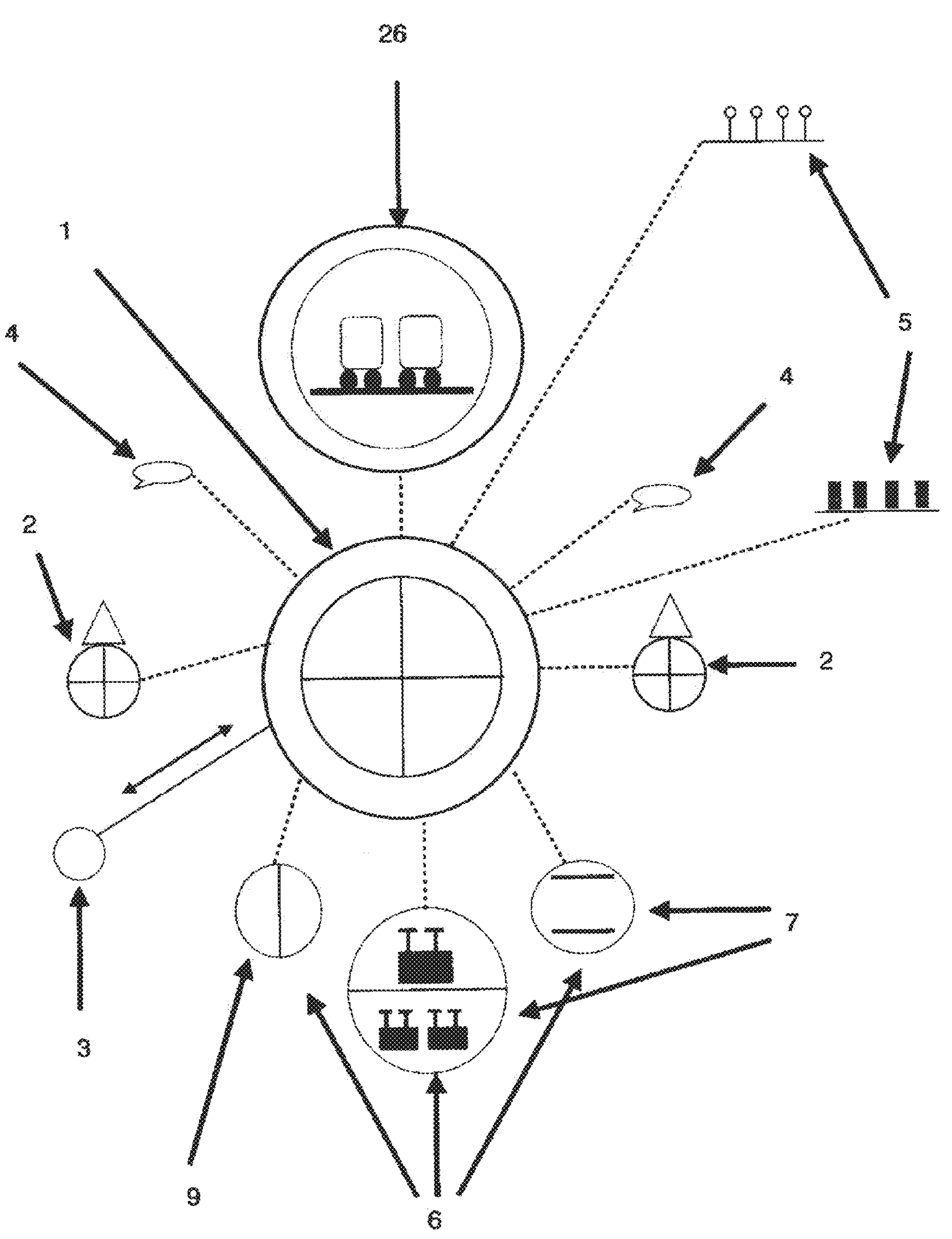
FIG. 1) Shows the F.U.P. system—1—in centre with attendant floating systems and delivery tubes. External buoyancy assist system and pipes with "chambers"—3. There are also examples of screw propeller and/or jet propulsion movement actuators—2. Human, animal and goods pipe —26. Goods only pipes—6. Cable, wire and pipes using the FUP buoyancy/framework—4. Sea farming, storage and environmental systems attached to system; Buoy Power system integration —5. Multi chamber pipe—1 and 9.
Figures 2, 3, 4, 5:
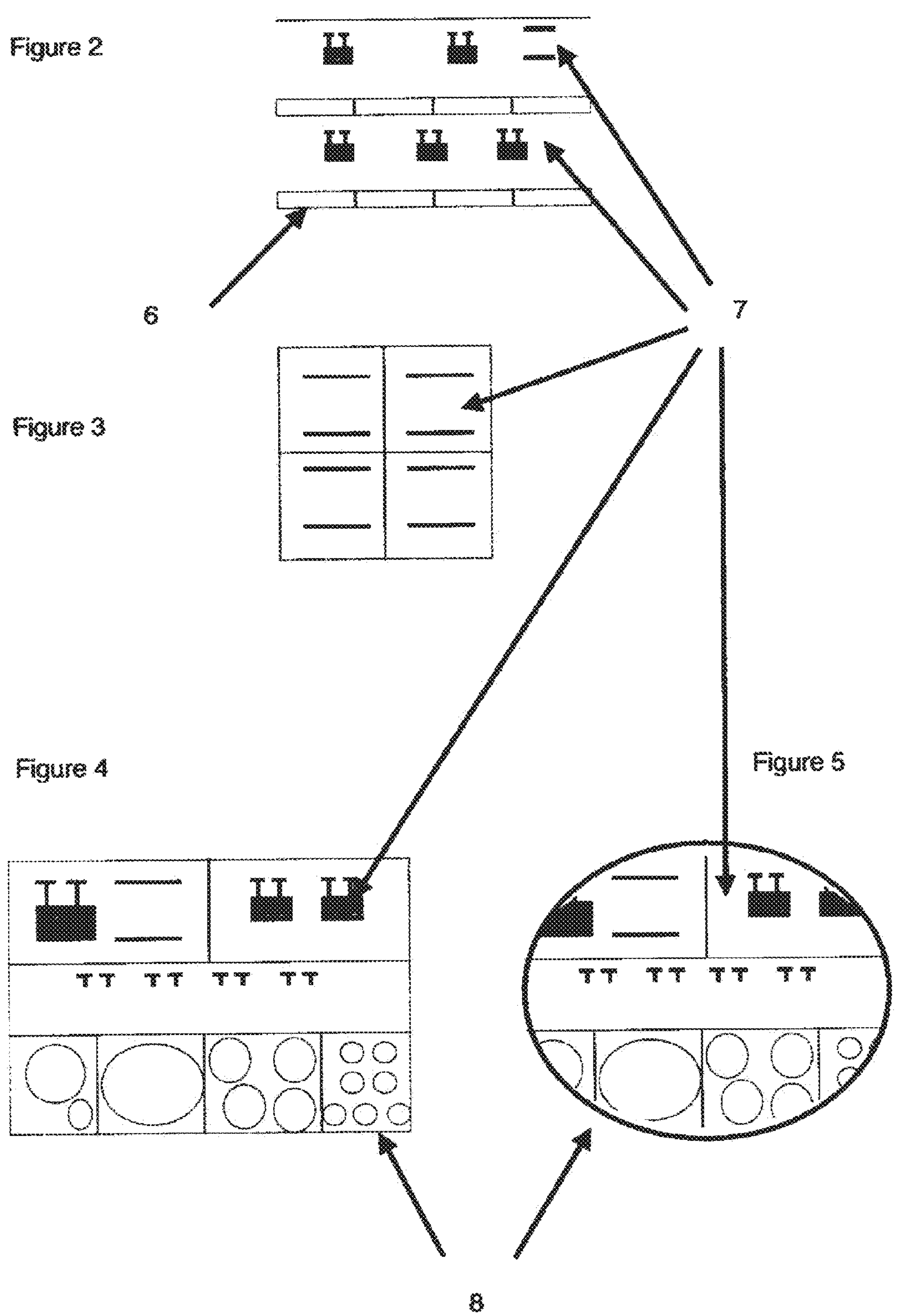
FIG. 2) Side view of goods delivery pipe—6. Including both drones and magnetically moved delivery methods—7.
FIG. 3) Section of pipe/Utility box with several channels or chambers to allow goods to flow at different rates and in different directions of desired—7.
FIG. 4) A cross section of the "Utility Box" showing examples of magnetic moved delivery boxes and drone in tube delivery—7. There are also separate sections for the running of piping, wiring or cables—8.
FIG. 5) Cross section of pipe format Utility Box with pipes, wires and cables—8—in addition to the goods delivery—7.
Figure 6:
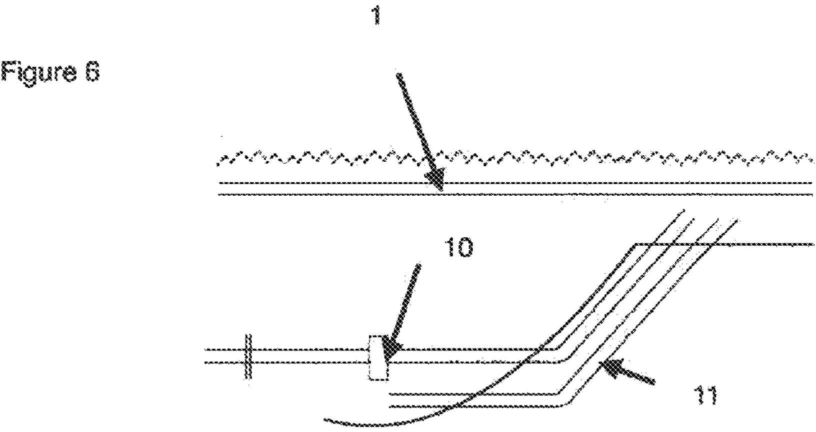
FIG. 6) Shows the three pipe formats for the delivery of water from river to need location. The full FUP format to the top—1; the middle shows FUP with interface to conventional pipe—10; the bottom showing conventional underwater pipe—11—with river capture function.
Figure 7:
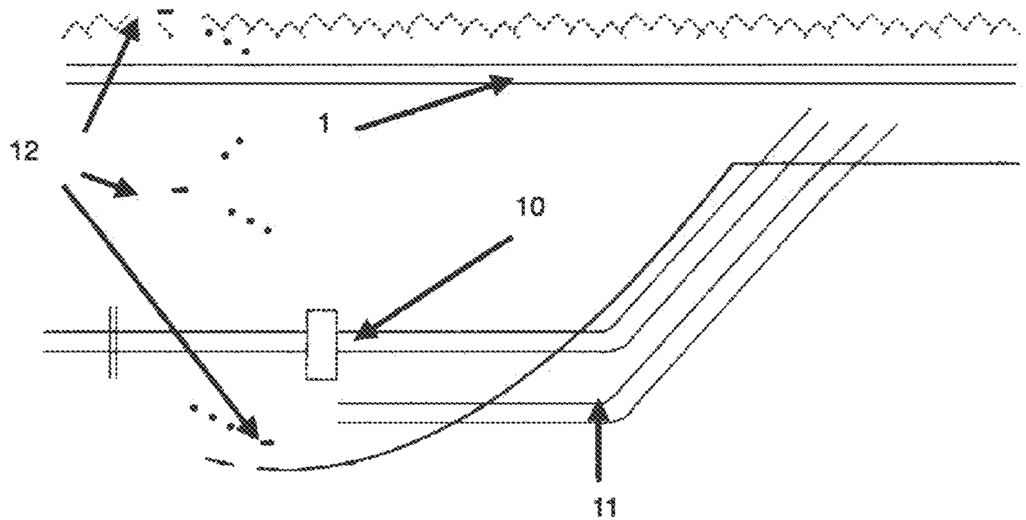
FIG. 7) Shows the "Gas Bag" system with the various piping methods to and from the bags—12—and the FUP—1, FUP with interface to conventional pipe—10—and conventional/underwater piping all the way—11. The bags are shown in three locations of floating, underwater and on water's base. Any of the pipe formats can attach (dotted lines) to any of the bags locations for desired outcome.
Figure 9:
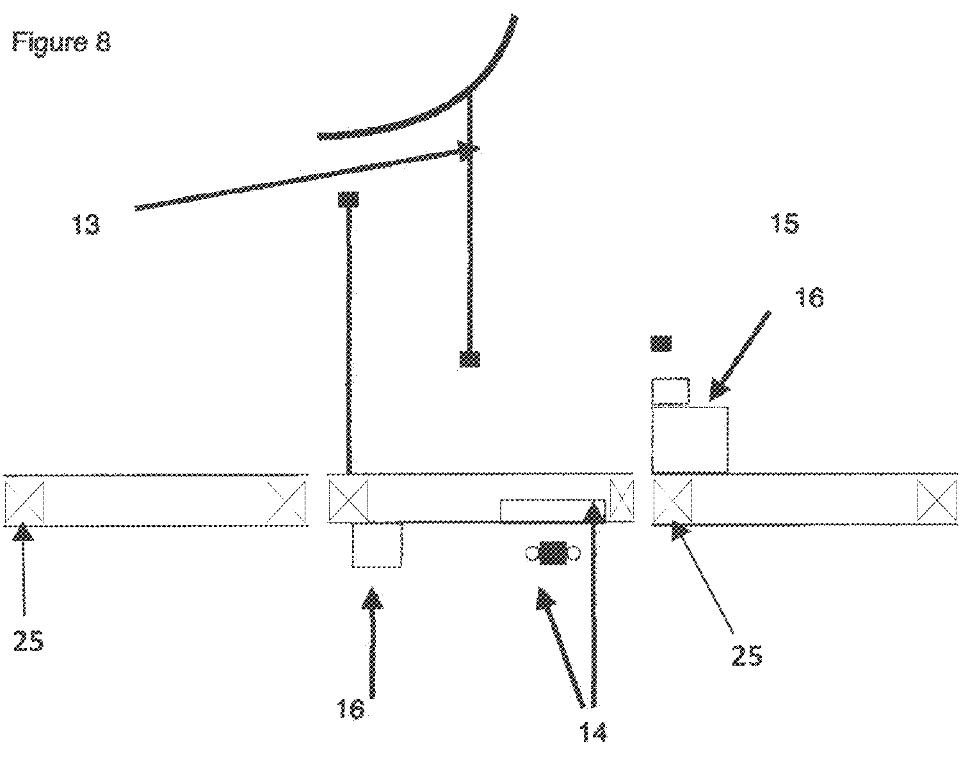
FIG. 9) Shows the existing pipeline format—17. Land pipeline and half bunding—18. Underwater or land pipe with full bunding—19.
Figure 10:
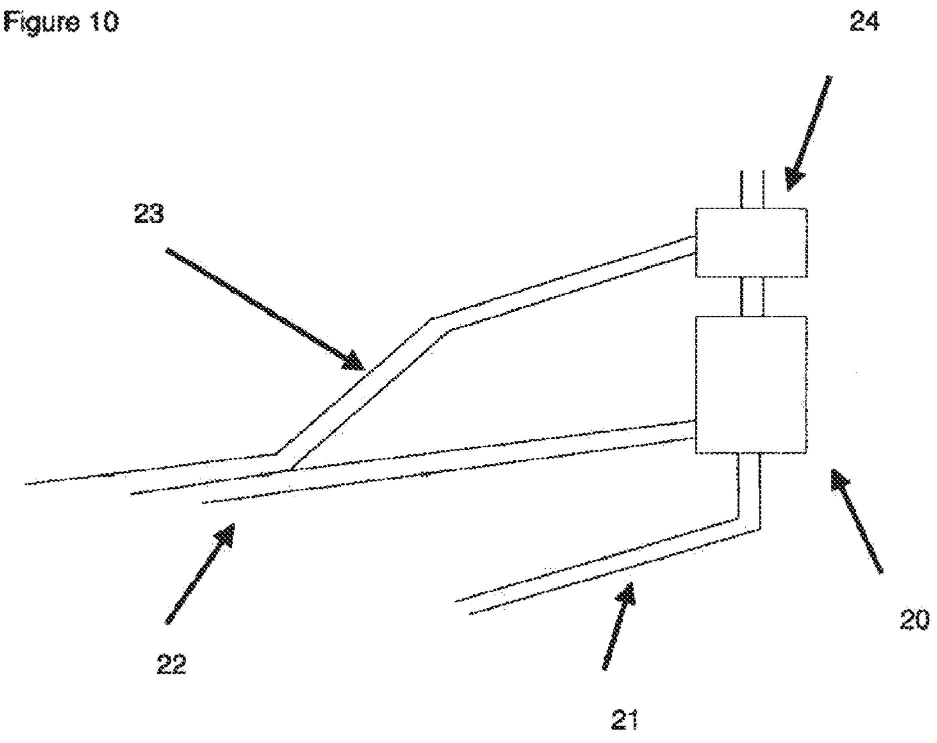
FIG. 10) Show a heating devise—20—working off "NatGas" product line—21—with separate pipe bringing in oxidizer—22—and taking away the cooled exhaust—23.
Figure 11:
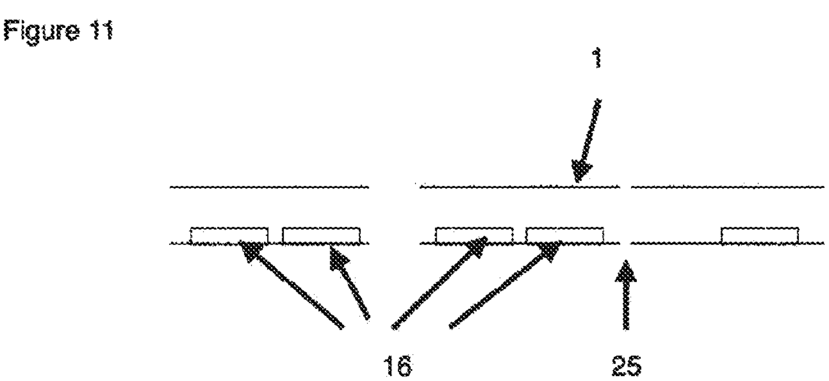

FIG. 11) Shows the FUP with example snap shut location at end of section—25. There is also a ballast pump and ballast chambers—16.

Figure 12:
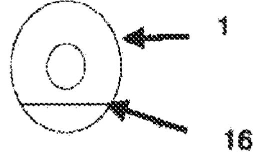

FIG. 12) Shows FUP in cross section, with single chambered pipe—1—with ballast chambers—16.

FIG. 13) Shows the CSaW system with containers—27—stored and in transit to the water based storage system. Traveling along pipes—1—, or dropped in from the top, the containers are then held in the storage area/“Saw Tube”—28.

FIG. 14) Images relating to the “interface” between the FUP and conventional pipes. A Shell design—29—to reel out and in. Stacked gliding “organ tubes”—30. Concertina style for movement—31. Static pipe with movable side pipe(s)—32.

It will be apparent and clear to those skilled in the art(s) that the subject technology is not limited to the specific details set forth herein and indeed the invention may encompass a variety of forms that may be similar to or different from the embodiments set forth.

What is claimed is:

1. A floating underwater pipeline FUP system connected to a destination at either end and free floating in-between without tethers attached to the seabed of floor, or being suspended from floats, the system comprising a number of connected individual submarines that 1) have a mechanism enabling movement without external reliance, that can steer through the water to connect up during building stage of FUP; 2) have an effect on buoyancy during operation; and 3) have automatic snap shut gates for spill or pressure protection for pipes, such that if a monitoring system detects a leak or loss of pressure, the system will automatically close the snap shut gates situated over a length of pipeline.

2. The system of claim 1, wherein the FUP system further comprises a multi chambered cross-section pipe to allow the use of parts of or the whole pipeline in desired format, a pipe that can, due to the multi chambered cross-section design, allow different substances or rates of flow to be transited at the same time, one pipe with many channels to allow precise control of product transit and speed with which the pipe can be brought in to operation; the pipeline comprising separate chambers for separate flows and enhanced control within the pipeline.

3. The system of claim 1, further comprising an interface to connect standard types of sub-sea pipelines to the FUP.

4. The system of claim 1, further comprising a plurality of pumps configured to move a product through the FUP.

5. The system of claim 1, configured to respond to a leak by deploying one or more of the following repair components: a bandage extended across damage and then enacted via water pressure, chemical or mechanical means to effectively bandage the section; a bandage imbued with one or more substances that interact with seawater to harden bandage over damaged section; the repair system being configured for use with the floating pipeline system, whereby these bandages are installed or retro-fitted on pipelines underwater, even the vertical ones, so in the event of spill, damage, or rupture, these can be extended across the section in question to not allow loss of product into surroundings.

6. The system of claim 1, further comprising an apparatus for a return piping system to allow the continued use of natural gas in heating whereby all emissions are trapped and accepted back into a system and delivered back to a system of sequestration or reprocessing, oxygen, NOx or oxidizing agents, and Carbon Dioxide or one or more emissions into a single pipes or two direction multi chambered pipes, oxidizer and exhaust pipes with Oxyfuel and NOxyfuel; Oxyfuel and one or more NOxyfuel heating systems and associated input and output pipelines; including a home exhaust heat transfer system to cool exhaust for use or transit, with ability to accept other sources of emissions, and retention of maximum heat.

7. The system of claim 1, wherein the FUP system is configured to transport goods through dedicated underwater pipes that are hydrodynamically shaped, including conventional shapes or combinations thereof, and configured, based on that shaping, to produce energy under vacuum and with or without reduced air resistance, the shapes including wing-like, aileron-like, eye-shaped, and sculpted non-round shape.

8. The system of claim 1, further comprising access doors along the length of the FUP via a pipe moon pool, for use with or without the snap shut gates along the pipeline; including buoyant ballast bags and motorized movement capability; a sent up or dropped down connector to allow the pipeline system to interact with surface or subsurface vessels for transferring goods, liquids and gases; maintenance ROVs configured to travel within or outside the underwater pipeline systems, including for repair; and human and animal transit within the curtilage of the self-buoyant and adjustable-height FUP pipeline system.

9. The system of claim 1, further comprising Buoy Power systems with tethered base or subsurface anchor buoy or submarine buoys for the generation of pumping power to be connected to or products delivered through above or below water pipes connected to the FUP system, whereby energy is derived from both the rise and fall, either in concert up and down actions, or in isolation up or down actions, of wave action and that energy is transferred, as either electric and hydraulic or direct hydraulic energy or mechanical energy or stored.

10. The system of claim 1, further comprising land based delivery pipelines connectable to the FUP for the shipment of goods within the pipeline or with the use of magnetic transit, suction, chain, pulley, or rail.

11. The system of claim 1, further comprising a spill bund pipeline whereby a secondary pipeline is built around the first so in the event of rupture the substance is still within the pipe system.

12. The system of claim 1, further comprising using pipelines to deliver sewerage to offshore locations and using return pipelines extending to land or shore to return produce from the offshore locations once treated including methane, fertilizer, and ammonia to use on or in water or for use on land.

13. The system of claim 1, further comprising underwater pipelines for the capture of fresh water including from rivers or estuaries before the water enters the sea, or salt water, and transport of said fresh water product via pipes to areas of need.

14. The system of claim 1, further comprising underwater or at sea container storage whereby containers are fed into a structure and stored dry using water or sea based locations rather than pressuring land based container storage, wherein the container storage structures include both temporary and permanent installations.

* * * * *